No. 747,531. PATENTED DEC. 22, 1903.
J. C. BOYD.
VEHICLE RUNNING GEAR.
APPLICATION FILED SEPT. 8, 1903.
NO MODEL.
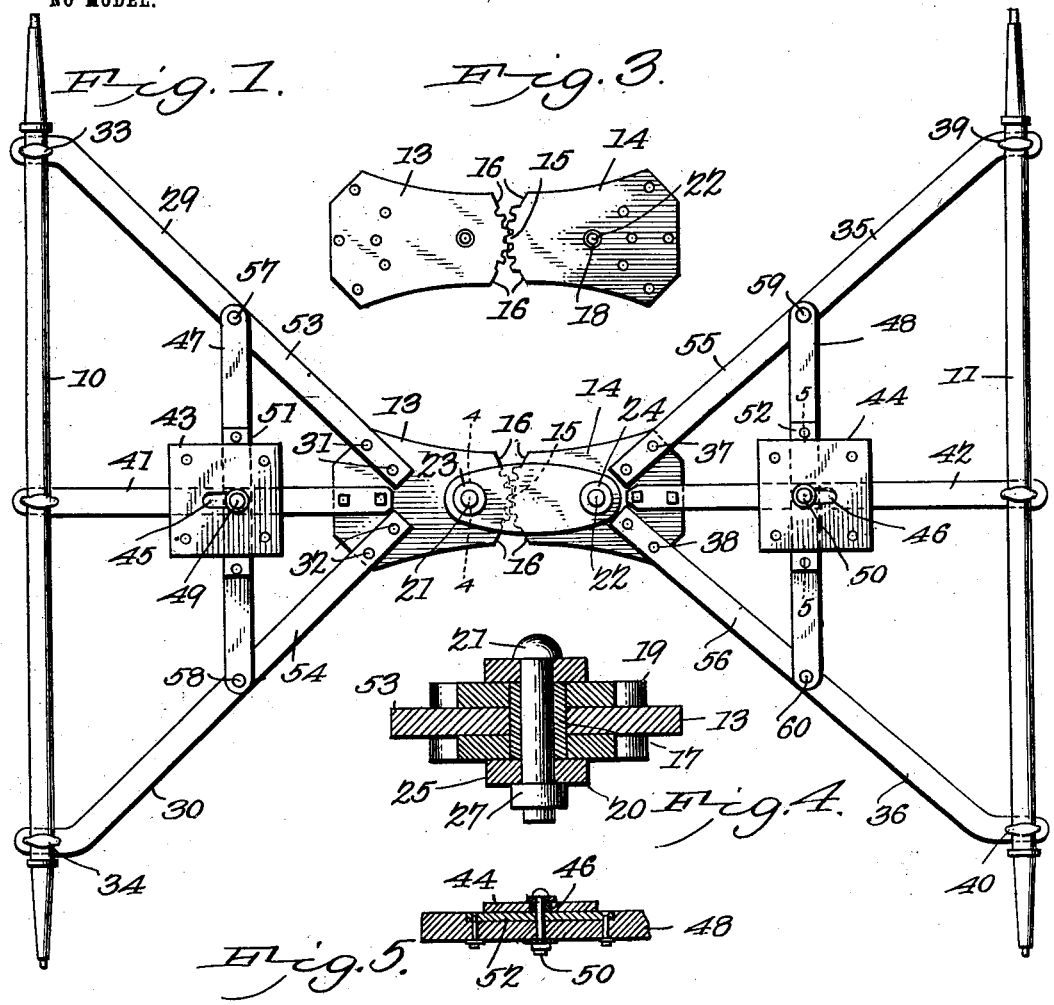
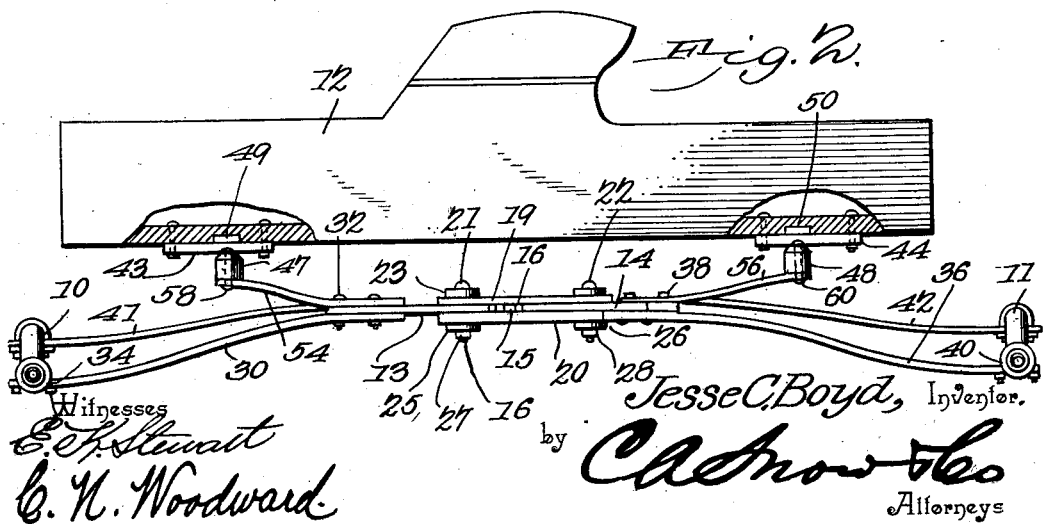
Witnesses
E. F. Stewart
C. N. Woodward
Jesse C. Boyd, Inventor.
by C. A. Snow & Co.
Attorneys No. 747,531. Patented December 22, 1903.

UNITED STATES PATENT OFFICE.

JESSE C. BOYD, OF RUSHVILLE, INDIANA, ASSIGNOR OF ONE-THIRD TO JOHN N. M. GARTEN, OF RUSHVILLE, INDIANA.

VEHICLE RUNNING-GEAR.

SPECIFICATION forming part of Letters Patent No. 747,531, dated December 22, 1903.

Application filed September 8, 1903. Serial No. 172,382. (No model.)

*To all whom it may concern:*

Be it known that I, JESSE C. BOYD, a citizen of the United States, residing at Rushville, in the county of Rush and State of Indiana, have invented a new and useful Vehicle Running-Gear, of which the following is a specification.

This invention relates to the running-gear of vehicles, more particularly of carriages, buggies, and similar vehicles of the class known as "short-turning," and has for its object to simplify and improve structures of this character and produce a device wherein the parts are so combined and coactively related as to counteract the "side thrust" and provide a substantially noiseless, quick-acting, and short-turning, easy-riding gear directly connected and wherein the perch member is dispensed with; and the invention consists in certain novel features of construction, as hereinafter shown and described, and specified in the claims.

In the drawings, in which corresponding parts are denoted by like designating characters, Figure 1 is a plan view of the running-gear with the body portion detached. Fig. 2 is a side elevation, partially in section. Fig. 3 is a plan view of the center segmental plates detached. Fig. 4 is an enlarged transverse section on the line 4 4 of Fig. 1. Fig. 5 is a section on the line 5 5 of Fig. 1.

The improved running-gear may be connected between any form and size of axles and vehicle-body, but for the purpose of illustration is shown connected to an ordinary forward axle 10, rear axle 11, and body portion 12. The bearing-wheels are not illustrated, as they form no part of the present invention, but will be of the ordinary construction.

Disposed centrally between the axles 10 11 are two metal plates 13 14, having their adjacent ends segmental in form and provided with intermediate intermeshing gear-teeth 15 and blank end portions 16, the gear-teeth providing for the coactive lateral movement of the plate and the blank portions providing stops to limit the movement.

At the radial centers of the gear-segments the plates 13 14 are respectively provided with concentric studs 17 18, and engaging these studs are tie-plates 19 20, which thus serve to hold the two plates 13 14, with their gear-teeth, in constant operative position.

The radius of the segment of the plate 13 is less than the segment of the plate 14, as shown, so that the latter will turn more slowly than the former, as hereinafter explained.

Clamp-bolts 21 22 are disposed centrally through the studs 17 18 and plates 13 14 and provided with relatively large washer-plates 23, 24, 25, and 26 and nuts 27 28, by which means the parts are clamped together, leaving the plates 13 14 free to oscillate between the tie-plates and operating upon the studs 17 18 as journals. The wear and strains are thus borne by the relatively large studs and the bolts relieved entirely from lateral strains, subjecting them to longitudinal strains only. By this arrangement also the bearing-surfaces between the parts 13 14 and 17 18 are materially enlarged, thereby decreasing the tendency to unequal wear and also materially decreasing the tendency to vibratory or lateral movement. All the bearing-surfaces are by this means relatively broad, so that the strains are distributed over a correspondingly-extended area and the durability and strength of the joints materially increased.

Extending between the outer end of the plate 13 and the axle 10 are connecting-bars 29 30, preferably in the form of elongated or strap springs, the inner ends of the bars being secured to the under side of the plate 13, as by bolts 31 32, and their outer ends secured, as by clips 33 34, to the axle 10 near its spindles, as shown. Extending between the plate 14 and the axle 11 are similar bars 35 36, secured by bolts 37 38 to the under side of the plate 14 and by clips 39 40 to the axle 11, as shown. The bars 35 36 will also, preferably, be resilient or spring-formed. Centrally-disposed bars 41 42 may likewise be connected, respectively, between the centers of the axles and the plates 13 14, as shown, and preferably of resilient form, like the other connecting-bars.

The numerous connecting-bars may each be in a single piece of steel of sufficient strength to resist the strains to which they will be subjected or of several thicknesses in the ordinary form of springs of this general character; but this would not be a departure from the principle of the invention, as the same results would be produced and in the same manner. By this simple arrangement of parts a very strong flexible connecting means is provided between the axles which enables the vehicle to be turned in a very short space and will cause the rear wheels to "cramp" in the opposite direction to the forward wheels, but at a slower speed, caused by the differences in the radial sizes between the segments of the plates 13 14. This provides for the smaller forward wheels to turn a greater extent than the larger rear wheels, so that the smaller forward wheels can be "cramped" to their full extent without danger of causing the larger and slower-moving rear wheels to strike the body portion.

Attached to the under side of the vehicle-body 12 are plates 43 44, having elongated apertures 45 46, and disposed beneath these plates are transverse bars 47 48, connected movably to the plates by bolts 49 50, passing through the bars and apertures 45 46, as shown. Embedded in the upper faces of the bars 47 48 are wear-plates 51 52, as shown. By this arrangement the body member 12 and bars 47 48 are movably connected, the bars free to move longitudinally of the body within the range of the apertures 45 46 and likewise swing on the bolts as centers.

Connected between the ends of the bars 47 48 and the plates 13 14 are bars 53, 54, 55, and 56, being bolted, as at 57, 58, 59, and 60, to the bars 47 48 and secured upon the upper faces of the plates 13 14 by the same bolts 31 32 and 37 38 which secure the bars 29 30 and 35 36, as shown.

The bars 53, 54, 55, and 56 are preferably resilient, like the bars 29, 30, 35, and 36, and when the parts are connected as shown a very light, compact, strong, and yieldable running-gear is produced which may be very cheaply constructed and adapted by slight and immaterial modifications to the various forms of vehicle-bodies and axles manufactured. By this arrangement of parts the lateral thrust is obviated in turning, the cumbersome and objectionable "fifth-wheel" dispensed with, and a very easy-running short-turning vehicle produced which will be found very serviceable and convenient for the purposes enumerated.

Having thus described the invention, what is claimed is—

1. A vehicle running-gear comprising the axles having the bearing-wheels, two plates disposed intermediately of the axles and connected respectively thereto, the adjacent ends of said plates formed with intermeshing gear-segments with the radius of one segment greater than the other, and coupling means between the respective centers of said segments, substantially as described.

2. A vehicle running-gear comprising the axles having the bearing-wheels, two plates disposed intermediately of the axles and connected respectively thereto, the adjacent ends of said plates formed with intermeshing gear-segments with the radius of one segment greater than the other and having blank spaces beyond the teeth, whereby one axle will "cramp" faster than the other and the lateral movement be limited, substantially as described.

3. A vehicle running-gear comprising the axles having the bearing-wheels, two plates disposed intermediately of the axles and connected respectively thereto by vertically-resilient bars, with the adjacent end of the plates formed with intermeshing gear-segments, coupling means between the respective centers of said segments, the body of the vehicle and vertically-resilient coupling means between said body and said plates, substantially as described.

4. A vehicle running-gear comprising the axles having the bearing-wheels, two plates disposed intermediately of the axles and connected respectively thereto, the adjacent ends of said plates formed with intermeshing gear-segments, coupling means between the respective centers of said segments, the vehicle-body disposed above said plates, resilient bars between said plates and axles, resilient bars between said plates and vehicle-body, and clamp-bolts uniting said bars to opposite sides of said plates, substantially as described.

5. A vehicle running-gear comprising the axles having the bearing-wheels, two plates disposed intermediately of the axles and connected respectively thereto, the adjacent ends of said plates formed with intermeshing gear-segments and with lateral studs concentric to the radial centers of said gear-segments, coupling-plates having spaced apertures movably engaging said studs, and clamp-bolts connecting said plates through said studs, substantially as described.

6. A vehicle running-gear comprising the axles having the bearing-wheels, two plates disposed intermediately of the axles and connected respectively thereto, the adjacent ends of said plates formed with intermeshing gear-segments, the vehicle-body, clamp-plates spaced apart and secured to said body members and provided with elongated apertures, transverse bars having clamp-bolts operating in said apertures, and resilient connecting means between said bars and segmental plates, substantially as described.

7. A vehicle running-gear comprising the axles having the bearing-wheels, two plates disposed intermediately of the axles and connected respectively thereto, the adjacent ends of said plates formed with intermeshing gear segments, the vehicle-body, clamp-plates spaced apart and secured to said body and provided with elongated apertures, transverse bars having wear-plates bearing upon said clamp-plates, clamp-bolts connecting said bars and wear-plates and engaging said clamp-plates through said elongated apertures, and resilient connecting means between said bars and segmental plates, substantially as described.

In testimony that I claim the foregoing as my own I have hereto affixed my signature in the presence of two witnesses.

JESSE C. BOYD.

Witnesses:
WILL M. SPARKS,
JOS. E. STEVENS.